(12) United States Patent
Okada et al.

(10) Patent No.: US 6,271,644 B1
(45) Date of Patent: Aug. 7, 2001

(54) BATTERY PACK

(75) Inventors: Setsuo Okada, Chiba; Yoshiharu Takasaki, Gifu-ken, both of (JP)

(73) Assignees: Hudson Soft, Co., Ltd., Hokkaido; Sanyo Electric Co., Ltd., Osaka, both of (JP)

( * ) Notice: Subject to any disclaimer, the term of this patent is extended or adjusted under 35 U.S.C. 154(b) by 0 days.

(21) Appl. No.: 09/598,945

(22) Filed: Jun. 22, 2000

(30) Foreign Application Priority Data

Jun. 22, 1999 (JP) .................................................. 11-175473
Aug. 6, 1999 (JP) .................................................. 11-224633

(51) Int. Cl.[7] ........................................................ H02J 7/00
(52) U.S. Cl. ............................................. 320/112; D13/103
(58) Field of Search ........................... 320/112; D13/103; 429/96, 99, 100

(56) References Cited

U.S. PATENT DOCUMENTS

| 5,489,486 | * | 2/1996 | Glover | 429/100 |
| 5,521,022 | * | 5/1996 | Petzl | 429/97 |
| 6,120,932 | * | 9/2000 | Slipy et al. | 429/99 |

* cited by examiner

Primary Examiner—Peter S. Wong
Assistant Examiner—Gregory J Toatley, Jr.

(57) ABSTRACT

A battery pack, capable of replacing a plurality of primary or secondary batteries, includes at least one battery body, a battery holder that houses the battery body, and a pair of positive and negative terminals. The battery pack is provided with a recess formed at one end of the battery holder to house a projecting battery terminal positioned in a battery case when the battery pack is stored in the battery case.

17 Claims, 4 Drawing Sheets

BATTERY PACK

BACKGROUND OF THE INVENTION

1. Field of the Invention

The invention relates to a battery pack capable of replacing a plurality of primary or secondary batteries, and more particularly to a battery pack which is easy-to-use and remarkably safe.

2. Description of the Background Art

Most of the currently prevailing portable electronic devices, including portable audio players of various kinds, PDAs (personal digital assistance) as typified by electronic notepads, and portable electronic games, use primary batteries, such as manganese batteries, alkaline batteries, or secondary batteries, such as nickel-cadmium batteries, as their power source. Such portable electronic apparatuses are generally designed to house a plurality of such batteries in a battery case and obtain necessary voltage therefrom.

FIG. 9 shows an example of such conventional art, wherein a battery case 41 is provided on the rear side of a portable electronic game to house 1.5V size AA batteries 42 and 43 and obtain 3V operating voltage therefrom. The battery case 41 comprises storage structures 44 and 45 separated by partition 46 to house batteries 42 and 43, respectively. A terminal board 47 positioned by the side of the positive terminal of the battery 42 comprises a positive battery terminal 48 in the shape of a ridging swell which is in contact with the positive terminal of battery 42. On the other hand, a terminal board 50 positioned by the side of the negative terminal of the battery 42 comprises a negative battery terminal 49 in the shape of a spring which is in contact with the negative terminal of the battery 42. Similarly, a positive battery terminal 51, and a negative battery terminal 52 which is connected to a terminal board 53 are positioned by the side of the positive and negative terminals of the battery 43, respectively, while the positive battery terminal 51 and the negative battery terminal 49 for the battery 42 commonly share the terminal board 50. In this structure, 2 size AA batteries are connected in series and 3V operating voltage is supplied to a positive input 54 and a negative input 55 of the power source of the electronic apparatus.

When the batteries 42 and 43 run out as a result of using the electronic apparatus, both batteries should be removed from the battery case and replaced with 2 unused batteries. In this case, those used batteries removed from the battery case easily get scattered and lost, causing inconvenience to users. In addition, when used batteries get scattered, they are often mixed up with unused batteries, which may result in erroneous loading of a used battery in a battery case with an unused one. Further, in the case of portable games, the users, especially children including those under school age, may not be able to insert batteries 42 and 43 in a battery case in the right direction. Such co-use of used and unused batteries, or insertion of batteries in the wrong direction not only causes failures in the electronic apparatus, but also endangers the safety of its users.

Moreover, when a positive terminal and a negative terminal of the conventional battery are connected electrically by any means, the circuit becomes short-circuited. This problem of short circuits, which may be caused by inappropriate storage of batteries or any other factors, raises concerns in terms of safety.

SUMMARY OF THE INVENTION

Accordingly, it is an object of this invention to provide a battery pack which is easy to use and safe in that problems of co-use of used and unused batteries, misplacement of batteries in the wrong direction, and short circuits can be avoided in advance.

According to this invention, a battery pack is capable of replacing a plurality of primary or secondary batteries and comprises at least one battery body, a battery holder to house the battery body, and a pair of positive and negative terminals, wherein a recess is formed at one end of the battery holder to house a negative battery terminal positioned in a battery case for storing the battery pack.

The recess can be formed by a sidewall extending on one side end of said battery body. The battery holder may include a groove extending in the longitudinal direction thereof which is capable of housing a battery partition positioned in said battery case. The battery body may be either a primary or secondary battery. Where the battery body is a secondary battery, it is preferable that the battery holder includes a pair of charging terminals which are electrically connected to the positive terminal and the negative terminal, respectively, so that discharged batteries can be recharged and reused repeatedly.

When a plurality of battery bodies are to be housed, it is preferable that the battery pack includes wires to connect said battery bodies in series and a contact point positioned between said wires. The contact point can be so structured that the contact point turns into a conducting state by switching means provided on a lid of a battery case. The switching means may be a projection protruded from the bottom plane of said lid of the battery case so that the projection pushes the contact point when the lid is closed. It is preferable that the contact point is placed in a position apart from the center of the top plane of the battery holder.

BRIEF DESCRIPTION OF THE DRAWINGS

The invention will be explained in more detail in conjunction with appended drawings, wherein.

DESCRIPTION OF THE PREFERRED EMBODIMENTS

Figure 1:
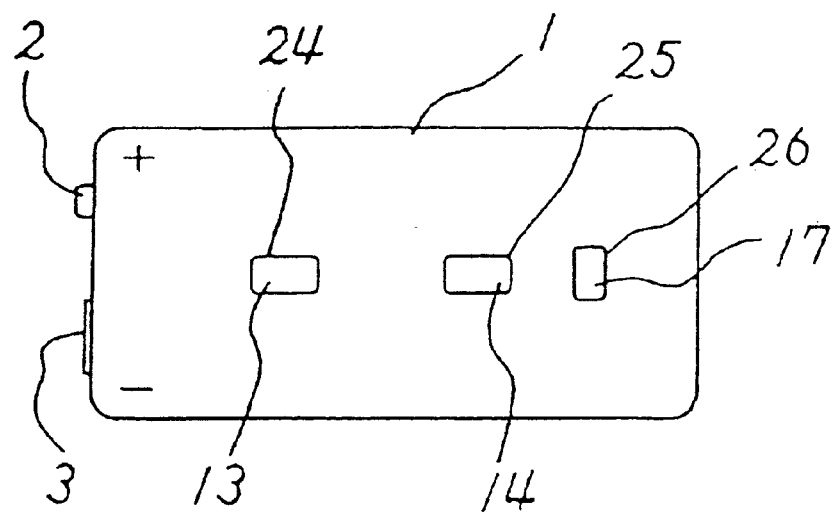
FIG. 1 is a top plan of the battery pack in the preferable embodiment according to the invention.
Figure 2:
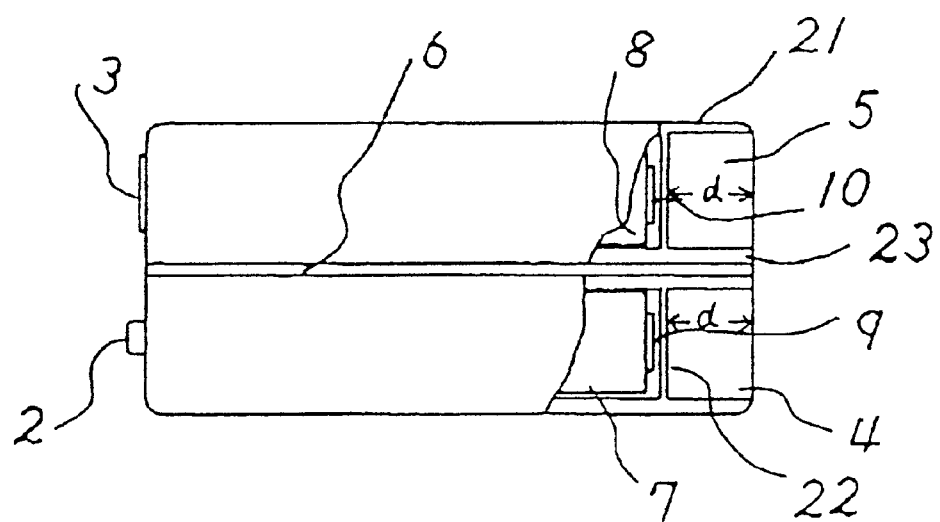
FIG. 2 is a rear elevation of the battery pack in FIG. 1, partly broken.
Figure 3:
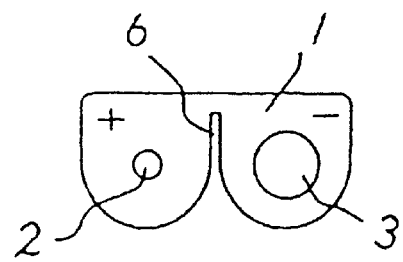
FIG. 3 is a left side view of the battery pack in FIG. 1.
Figure 4:
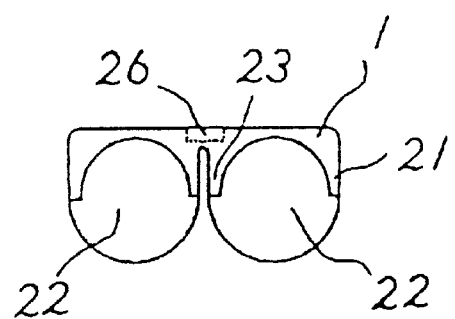
FIG. 4 is a right side view of the battery pack in FIG. 1.
Figure 5:
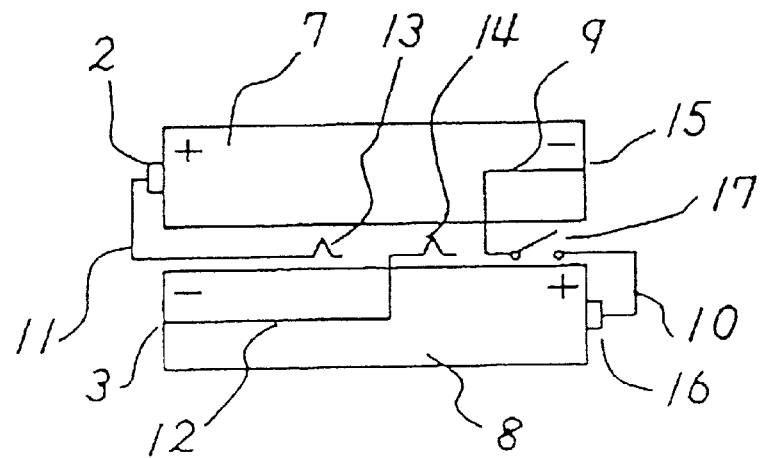
FIG. 5 is a wiring diagram of the battery pack shown in FIG. 1 including the battery bodies.

FIGS. 1, 2, 3, 4 and 5 show a battery pack in the preferred embodiment according to the invention. The battery pack comprises a battery holder 1 and a pair of a positive terminal 2 and a negative terminal 3 positioned at one end thereof. FIG. 2 is a rear view of the battery pack, wherein recesses 4 and 5 are formed at the other end of the battery holder 1 and a groove extending in the longitudinal direction thereof is formed in the middle of the width. The battery holder 1 houses two battery bodies 7 and 8 consisting secondary batteries which are separated by the groove 6. The negative terminal of the battery body 7 and the positive terminal of the battery body 8 are connected to wires 9 and 10, respectively, so that the battery body 7 and the battery body 8 can be electrically connected in series. As shown in FIG. 4, the recesses 4 and 5 are formed to be U-shaped by sidewalls 21 and 23, which constitute parts of battery holder 1 and extend on one side (the right side in FIG. 2) of the battery bodies 7 and 8. The depth d of each recess is enough to contain an uncompressed or slightly compressed negative terminal in a battery case of an electronic apparatus (not shown), which generally comprises a spring positioned in such battery case. The recesses 4 and 5, and the battery bodies 7 and 8 are separated by an inner wall 22, respectively. The above-mentioned groove 6 is deep enough to contain a battery partition (generally in the shape of a plate extending along the length) positioned in advance in the battery case of the electronic apparatus (not shown) when the battery pack is loaded thereto. Again referring to FIG. 1, openings 24 and 25 are provided on the top plane of the battery holder 1 to expose a pair of a positive recharging terminal 13 and a negative recharging terminal 14, respectively, through which the battery bodies 7 and 8 are rechargeable by an outside power source. On the other hand, the opening 26 exposes a contact point 17 which serves to electrically connect the battery bodies 7 and 8 in series under certain conditions as described below. The contact point 17 is positioned apart from the center of the top plane of the battery holder 1. In FIG. 5, the positive recharging terminal 13 and the negative recharging terminal 14 are connected to the positive terminal 2 and the negative terminal 3 of the battery body 7 by the wires 11 and 12, respectively, while the negative terminal 15 of the battery body 7 and the positive terminal 16 of the battery body 8 are connected by wires 9 and 10, between which the contact point 17 is provided.

Figure 6:
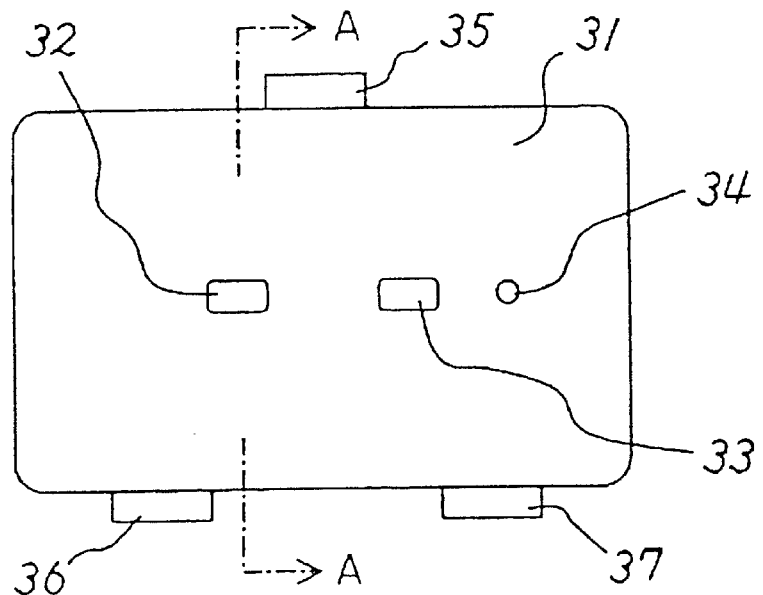
FIG. 6 is an explanatory diagram showing an example of a lid of a battery case suitable for the battery pack shown in FIG. 1.
Figure 7:
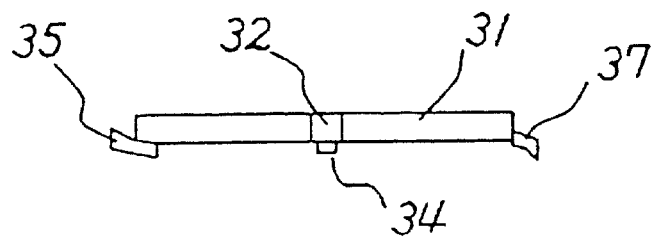
FIG. 7 is a cross section of the lid of the battery case taken on line A—A in FIG. 6.

FIGS. 6 and 7 show a preferred example of a lid of a battery case for loading the battery pack in the first preferred embodiment to a battery case which is designed for conventional battery packs. FIG. 6 shows the rear view of the lid, wherein fixing tabs 35, 36 and 37 are positioned on an upper side and lower side of the lid 31 in the same way as conventional lids of battery cases. In FIG. 6, openings 32 and 33 are provided in positions corresponding to the positive recharging terminal 13 and the negative recharging terminal 14, which are provided on the battery pack in the preferred embodiment as described before. The openings 32 and 33 are provided so that the recharging terminals 13 and 14 are exposed therethrough when the lid 31 of the battery case is closed. As shown in FIG. 6, a switching means 34 is provided in a position corresponding to the position of the contact point 17. Moreover, the switching means 34 is formed as a projection in cylindrical shape.

Figure 8:
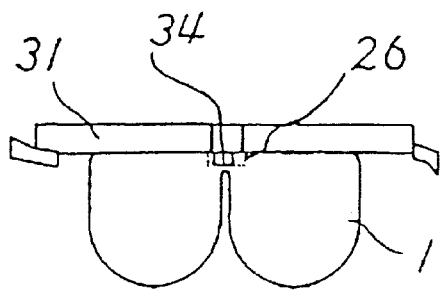
FIG. 8 is an explanatory diagram showing the battery in FIG. 1 and the lid of the battery case in FIG. 6 combined together.
Figure 9:
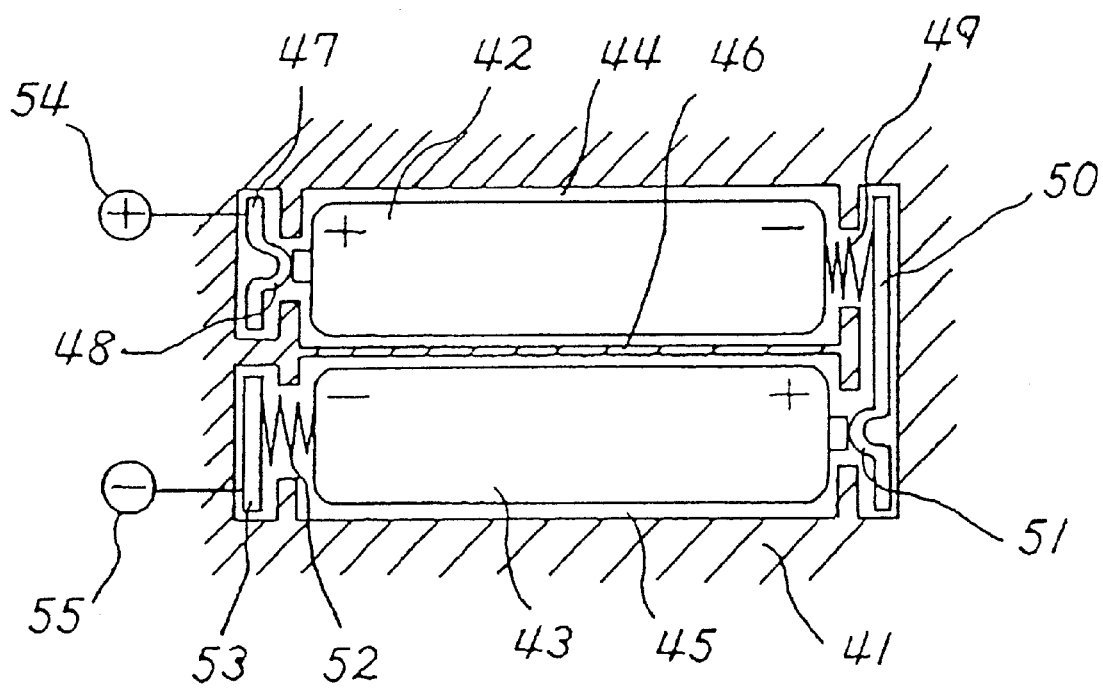
FIG. 9 is an explanatory diagram showing two conventional batteries loaded in a battery case of an electronic apparatus.

As shown in FIG. 8, since the switching means 34 in the form of a projection is provided on the bottom plane of the lid 31 of the battery case, it pushes the contact point 17 exposed through an opening 26 of the battery holder 1 and electrically connects the two battery bodies 7 and 8, when the battery pack is loaded in the right direction in the battery case (not shown) and the lid 31 of the battery case is closed.

In operation, when the battery pack is set properly in a battery case of an electronic apparatus, the positive terminal 2 and the negative terminal 3 of the battery pack are in contact with the positive battery terminal (swell) and the negative battery terminal (spring) of the battery case, respectively, while the respective battery terminals are connected to the positive and negative inputs of the power source of the electronic apparatus. The other positive battery terminals (swells) and negative battery terminals (springs), which conventionally connect two battery packs in series electrically, do not contribute to the electric connection of the battery pack in this preferred embodiment. Thus, the recess 4 is formed at one end of the battery holder 1 to store the negative battery terminal provided in the battery case. Consequently, where the positive and negative terminals of the battery pack are in the right direction in relation to the battery case, the negative battery terminal (spring), which is making no contribution in said electrical connection, is properly housed (the partition in the battery case being contained in the groove 6 provided on the bottom plane of the battery pack) and loaded easily. Accordingly, the conventional battery case, which conventionally requires two conventional batteries to be loaded therein, only requires one battery pack in the preferred embodiment to be loaded therein, thereby handling of the battery pack being considerably improved.

The structure of the battery pack in this preferred embodiment may allow the battery pack to be loaded in the wrong direction to the battery case. However, in such a case, the positive and negative terminals of the battery pack do not electrically contact with the positive and negative battery terminals connected to the input of the electronic apparatus. Since electrical power is not supplied to the electronic apparatus and the apparatus does not operate even after the power switch is turned on, defects of apparatus due to batteries loaded in the wrong direction and occurrences of injuries to users arising therefrom can be avoided in advance. In addition, when the electronic apparatus is not working, an user can realize that the battery pack is very likely to be loaded in the wrong direction, thereby proceeding to reload the battery pack in the right direction.

In this preferred embodiment, the battery pack includes the wires 9 and 10 for connecting battery bodies 7 and 8 in series, and the contact point 17 positioned between them, wherein the contact point is made to be on by the switching means 34 mounted on the lid 31 of the battery case. Thus, electricity runs only when the battery pack of the invention is set in the battery case of the electronic apparatus in the right direction and the lid of the battery case is closed. Accordingly, where the battery pack is not set in the battery case, the battery pack is not active and a voltage is not generated between the positive terminal 2 and the negative terminal 3 of the battery pack. Thus, the problem of short circuit is avoided and the safety is improved significantly. Instead of the projection 34 protruded from the bottom plane of the lid 31 of the battery case, any switching means, electrical or mechanical, which functions to close the contact point 17 and lets the electricity run in the battery bodies when the lid of the battery case is properly closed, may be used. As shown in this preferred embodiment, it is preferable that the contact point 17 and the switching means 34 be located apart from the center of the bottom plane of the lid 34 of the battery case so that the electricity does not run when the battery packs of the invention are loaded in the wrong direction. The height of the projection 34 may be adjusted so that the lid of the battery case can be closed even when conventional batteries are loaded therein.

In the preferred embodiment, the recharging terminals 13 and 14 are exposed respectively through the openings 32 and 33 provided on the lid 31 of the battery case. Thus, where the battery pack runs out as a result of using the electronic apparatus, the battery pack can be recharged by setting the electronic apparatus loaded with the battery pack, the lid of the battery case being closed, to a recharging device (not shown) which is particularly designed to supply electricity to the charging terminals 13 and 14. In this case also, another means similar to the switching means 34 may be provided in the recharging device to let a contact point on.

Although the two recesses 4 and 5 are formed at one end of the battery holder 1 in the preferred embodiment, the recess 5 may be omitted obviously only if the recess 4 is formed on the opposite side of the positive terminal 2 at one end of the battery holder 1. In this case, the negative battery terminal provided in the battery case is housed in this recess 4.

Although the positive terminal 2 and the negative terminal 3 of the battery pack are shown to be structured as a cylindrical projection and a plane, respectively, they may be in any other structures as far as they function to keep electrical contacts with the positive and negative terminals of the battery case. For example, the positive terminal 2 may comprise an elastic body such as a spring. In such a case, even if the negative battery terminal (spring) of the battery case pushes the negative terminal 3 of the battery pack loaded in the battery case, thereby slightly shifting the battery packs in such a direction as to break contact between the positive terminal 2 of the battery and the positive battery terminal of the battery case, the positive terminal 2 securely keeps the electric contact.

According to the preferred embodiment of this invention, the battery bodies 7 and 8 are in cylindrical shape, and such two battery bodies arranged in parallel form a gap space between them. The contact point 17 may be placed in the gap, thereby using the gap space effectively and housing the contact point 17 in the battery holder 1 without any protrusion beyond the battery holder 1. Consequently, the exterior surface of the battery holder 1 has no protrusion of the contact point 17 thereby remaining flat, and the problem of short circuit may be avoided.

Finally, the advantages of the invention are summarized as follows. As described before, the battery pack of the invention is capable of replacing a plurality of primary or secondary batteries and comprises at least one battery body, a battery holder to house said battery body, and a pair of positive and negative terminals, wherein a recess is formed at one end of said battery holder to house negative battery terminal positioned in a battery case for storing said battery pack. Thus, the battery pack, which does not fall apart and get scattered as the conventional ones, are much easier to handle. Further, the problems of co-use of used and unused batteries, and misplacement of batteries in the wrong direction can be avoided. In cases where the battery pack houses a plurality of battery bodies and includes a contact point provided between the wires for connecting the battery bodies in series, the problem of short circuit is avoided in advance and a battery so reliable in terms of safety is obtained.

Although the invention has been described with respect to specific embodiments, the appended claims are not to be thus limited but are to be construed as embodying all modification and alternative constructions to the extent that they fall within the technical idea of claimed invention.

What is claimed is:

1. A battery pack, capable of replacing a plurality of primary or secondary batteries, comprising:
   at least one battery body;
   a battery holder housing said at least one battery body; and
   a pair of terminals, one terminal being positive and one terminal being negative, wherein:
      a recess is formed at one end of said battery holder to house a projecting battery terminal positioned in a battery case in a manner that prevents the projecting battery terminal positioned in the battery case from making electrical contact with said battery pack when said battery pack is stored in the battery case.

2. A battery pack according to claim 1, wherein:
   said recess is formed by a sidewall extending on one side end of said battery body.

3. A battery pack according to claim 1 or 2, wherein:
   said battery holder includes a groove extending in the longitudinal direction thereof and capable of housing a battery partition provided in the battery case when said battery pack is stored in the battery case.

4. A battery pack according to claims 1 or 2, wherein:
   said battery body is a secondary battery and said battery holder includes a pair of recharging terminals electrically connected to said positive and negative terminals, respectively.

5. A battery pack according to claim 4, wherein a top plane of said battery holder includes first and second openings, beneath which said pair of recharging terminals are respectively positioned.

6. A battery pack according to claim 1, wherein said recess extends in the length direction of said at least one battery body to receive the projecting battery terminal positioned in the battery case.

7. A battery pack according to claim 1, wherein, when said battery pack is stored in the battery case, the projecting battery terminal positioned in the battery case is housed in said recess along the length direction of the battery body and separated from a terminal of the battery body by a wall of said battery pack.

8. A battery pack according to claim 1, wherein said battery holder houses two battery bodies, and two recesses are formed at one end of said holder, side-by-side, one of which houses a projecting battery terminal of a battery case when said battery pack is stored in the battery case.

9. A battery pack according to claim 8, wherein said two recesses each extend in the length direction of a corresponding battery body housed in said battery holder.

10. A battery pack according to claim 1, wherein the projecting battery terminal positioned in the battery case is a spring and said recess has sufficient depth to house the spring.

11. A battery pack according to claim 1, wherein the projecting battery terminal positioned in the battery case is a negative battery terminal.

12. A battery pack, capable of replacing a plurality of primary or secondary batteries, comprising:
   plural battery bodies;
   a battery holder housing said plural battery bodies;
   a pair of terminals, one terminal being positive and one terminal being negative;
   wires for connecting a plurality of said battery bodies in series; and
   a contact point provided between said wires,
   wherein a recess is formed at one end of said battery holder to house a projecting battery terminal positioned in a battery case when said battery pack is stored in the battery case.

13. A battery pack according to claim 12, wherein:
   said contact point is switched on by a switching means provided on a lid of the battery case.

14. A battery pack according to claim 13, wherein:
   said switching means comprises a projection protruded from the bottom plane of said lid of the battery case.

15. A battery pack according to claim 14, wherein:
   said contact point is placed in a position apart from the center of the top plane of the battery holder.

16. A battery pack according to claim 13, wherein:
   said contact point is placed in a position apart from the center of the top plane of the battery holder.

17. A battery pack according to claim 12, wherein:
   said battery bodies are cylindrical in shape and arranged in parallel, whereby said contact point is placed in a gap between said battery bodies.

* * * * *